United States Patent [19]

Kohn

[11] Patent Number: 4,549,907
[45] Date of Patent: Oct. 29, 1985

[54] THIXOTROPIC AQUEOUS SOLUTIONS CONTAINING A CROSSLINKED POLYGALACTOMANNAN GUM

[75] Inventor: Rachel S. Kohn, Springfield, N.J.

[73] Assignee: Celanese Corporation, New York, N.Y.

[21] Appl. No.: 684,330

[22] Filed: Dec. 20, 1984

[51] Int. Cl.[4] .................. C08B 37/00; C08G 59/40; C09K 7/02; B01J 13/00

[52] U.S. Cl. .................. 106/208; 252/8.55 R; 252/311; 536/114

[58] Field of Search .................. 524/55; 527/300; 106/205, 208; 252/311, 8.55 R; 536/52, 55.3, 114, 120, 124, 126

[56] References Cited

U.S. PATENT DOCUMENTS

| | | | |
|---|---|---|---|
| 2,976,274 | 3/1961 | McNeely et al. | 536/114 |
| 3,346,555 | 10/1967 | Nordgren | 536/52 |
| 3,912,713 | 10/1975 | Boonstra et al. | 106/205 |
| 4,031,305 | 6/1977 | DeMartino | 536/114 |
| 4,057,509 | 11/1977 | Costanza et al. | 536/114 |
| 4,094,795 | 6/1978 | DeMartino et al. | 536/52 |
| 4,169,945 | 10/1979 | DeGuia et al. | 536/114 |
| 4,452,639 | 6/1984 | Kohn | 106/205 |
| 4,469,620 | 9/1984 | Kohn | 536/114 |

*Primary Examiner*—John Kight
*Assistant Examiner*—Nathan M. Nutter
*Attorney, Agent, or Firm*—Depaoli & O'Brien

[57] ABSTRACT

This invention provides a thixotropic aqueous solution that contains a thickening agent consisting of polygalactomannan gum which is crosslinked with a diglycidyl ether of polyoxyalkylene diol.

An invention thixotropic aqueous medium is characterized by excellent heat stability and high tolerance to the presence of inorganic salts.

A unique property of an invention thixotropic aqueous medium is a time-dependent gradual restoration of high viscosity after cessation of high shear deformation.

15 Claims, 2 Drawing Figures

RECOVERY OF 1% CROSSLINKED GUAR SOLUTION AFTER VIGOROUS SHEARING

THIXOTROPIC AQUEOUS SOLUTIONS CONTAINING A CROSSLINKED POLYGALACTOMANNAN GUM

BACKGROUND OF THE INVENTION

Many liquid media possess a relative degree of elasticity and tensile strength, and are classified as viscoelastic materials. Some liquid media are characterized by pronounced elasticity and high tensile strength, and exhibit unique characteristics during laminar flow, i.e., they are superelastic liquids.

One characteristic of superelastic liquids is a tendancy to recoil when deforming forces acting on them are removed, and the potential energy stored in the liquids as a result of deforming forces is converted into kinetic energy. Another unique characteristic of superelastic liquid media is the ability to build up resistance to deformation as shear stresses increase and to flow readily at shear stresses about certain values.

It has been found that these and other properties qualify such liquid media as particularly useful for controlling lost circulation in oil field drilling operations and in related applications.

The superelastic liquids which have the greatest utility are those prepared by crosslinking water-soluble polymers in aqueous solution. It has been found that polysaccharidic hydrocolloids can be crosslinked in aqueous solution to produce viscous liquid media which are highly elastic and have considerable tensile strength.

U.S. Pat. No. 2,644,762 describes a water-dispersible dry blend mixture comprising locust bean gum, sodium borate and glyoxal or pyruvic aldehyde. The mixture is dispersed in cold water, and the dispersion is heated above 200° F. to produce a clear solution of high viscosity.

U.S. Pat. No. 2,968,581 describes a method of crosslinking polymeric polyhydroxy materials which involves reacting the said materials in the presence of water with a preformed polymeric acetal.

U.S. Pat. No. 2,976,274 describes a method for preparing a water-soluble thickening agent by reaction of gum arabic, dextran or corn fiber gum with a bifunctional crosslinking agent such as epihalohydrins or glycerol dihalohydrins.

U.S. Pat. No. 3,697,498 describes a novel crosslinking agent for use with aqueous solutions of polysaccharides to form enhanced shear rate thinning viscoelastic solutions, wherein the said crosslinking agent consists essentially of a chelating composition formed from an organic polyelectrolyte ligand component, and a compound of a metal of the first series of the transition elements of the Periodic Table.

U.S. Pat. No. 3,829,412 describes an improved procedure for modifying polysaccharides such as hemicellulose by crosslinking with a bifunctional etherifying reagent such as epichlorohydrin.

U.S. Pat. No. 3,836,465 describes a viscoelastic hydraulic fluid composition comprising an aqueous medium containing a mixture of polyalkylene oxide and lignosulfonate salt.

U.S. Pat. No. 4,183,765 describes a method of increasing the viscosity of a hydroxyalkyl cellulose solution by treatment with benzoquinone under controlled pH conditions.

Of general interest relative to the present invention, U.S. Pat. No. 4,287,078 describes novel defoaming agents which are prepared by the reaction of polyoxyalkylene polyols with polyglycidyl ethers.

The various non-Newtonian viscoelastic solutions disclosed in the prior art usually are characterized by one or more disadvantages which limit their applicability in important commercial operations, e.g., for use as hydraulic fluid vehicles in well-drilling and in secondary oil and gas recovery from subteranean formations.

One disadvantage is that some high viscosity solutions are not sufficiently thixotropic in relation to low and high shear rates.

Another disadvantage is that with some methods of thickening aqueous solutions there is not sufficient control over the attainment and maintenance of the desired viscosity range and properties.

Another disadvantage is that with some methods of thickening aqueous solutions it is necessary as a subsequent procedure to add a pH control reagent to an aqueous solution treated with a thickening agent, to effect the desired rate of formation and degree of viscoelastic properties in the aqueous solution.

Another disadvantage of some viscoelastic solutions is an intolerance to the presence of inorganic electrolytes.

A further disadvantage of some viscoelastic solutions is a sensitivity to temperatures above about 60° C., and a consequential degradation of rheological properties.

Accordingly, it is an object of this invention to provide a novel thickening agent adapted to impart thixotropic properties to an aqueous medium without a need for subsequent adjustment of pH conditions.

It is another object of this invention to provide a process for imparting viscoelastic properties to an aqueous medium.

It is a further object of this invention to provide a thixotropic aqueous solution which exhibits improved heat stability and tolerance to the presence of inorganic electrolytes.

Other objects and advantages of the present invention shall become apparent from the accompanying description and examples.

DESCRIPTION OF THE INVENTION

Figure 1:
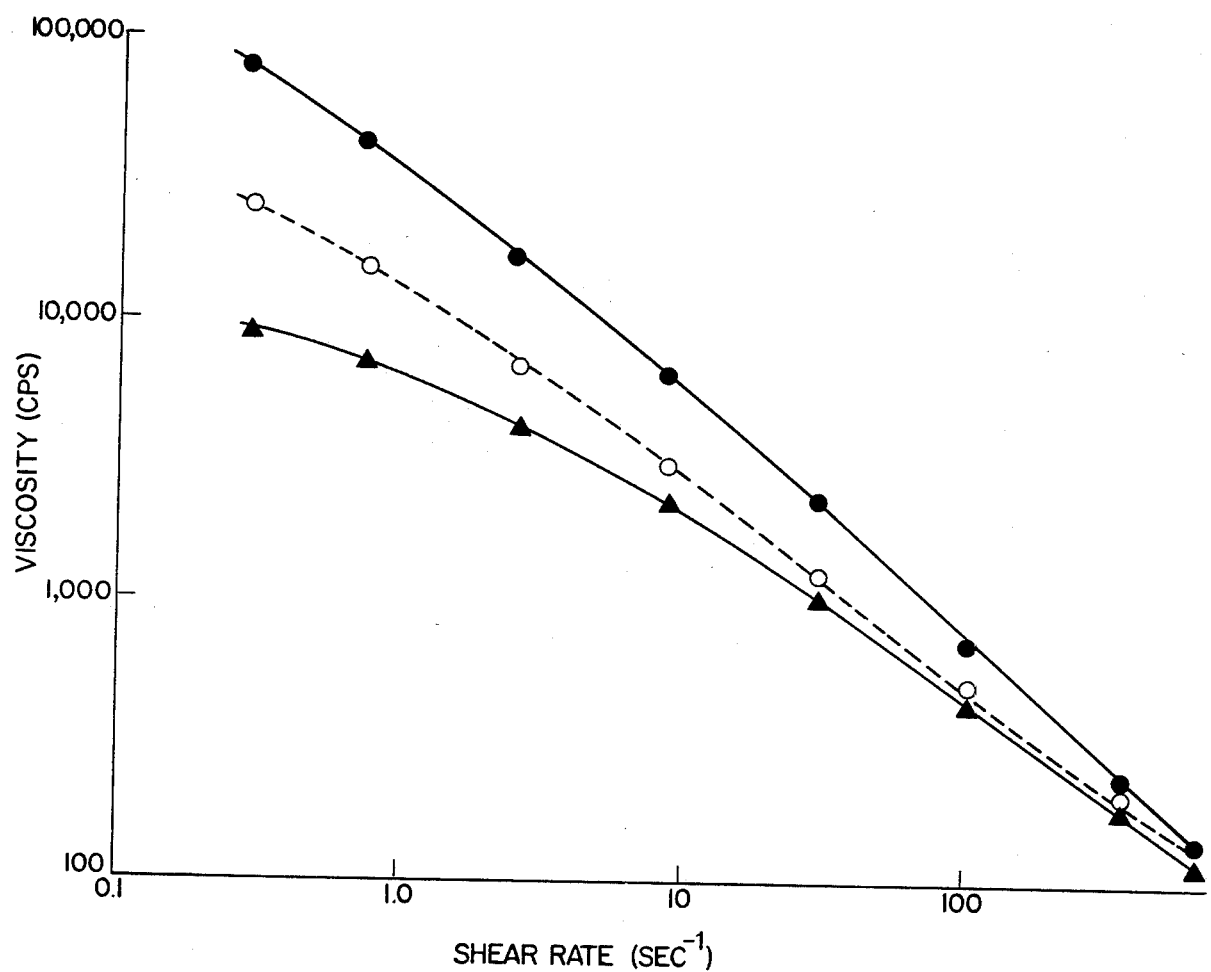
FIG. 1 illustrates the relationship of viscosity and shear rate of a 1% solution of diglycidyl ether-modified guar gum and a control of unmodified guar gum.

One or more objects of the present invention are accomplished by the provision of a process for preparing a thixotropic aqueous solution which comprises treating an aqueous medium with a thickening agent comprising (1) polygalactomannan gum, (2) between about 1-10 millimoles of diglycidyl ether of polyoxyalkylene diol per mole of polygalactomannan gum, and (3) a water-soluble basic reagent.

In another embodiment, this invention provides a process for producing a thixotropic aqueous solution containing crosslinked polygalactomannan gum which comprises dissolving in an aqueous medium constituents comprising (1) polygalactomannan gum, (2) between about 1-10 millimoles of diglycidyl ether of polyoxyalkylene diol per mole of polygalactomannan gum, and (3) a water-soluble basic reagent; wherein the product thixotropic solution at a 1.0 weight percent content level of the polygalactomannan gum exhibits a viscosity of 10,000–120,000 centipoises at a shear rate of 0.3 reciprocal seconds, a viscosity of 300–10,000 centipoises at a shear rate of 5 reciprocal seconds, and a viscosity of 50–300 centipoises at a shear rate of 500 reciprocal seconds, and wherein the solution has the ability to recover the low-shear high-viscosity state over an elapsed time period.

In another embodiment, this invention provides a thixotropic aqueous solution containing a thickening agent comprising polygalactomannan gum which is crosslinked with a diglycidyl ether of polyoxyalkylene diol. Illustrative of a preferred composition is a thixotropic aqueous solution containing a diglycidyl ether of polyoxyalkylene diol corresponds to the formula:

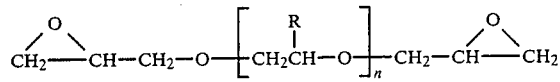

where R is hydrogen or an alkyl substituent containing between about 1–4 carbon atoms, and n is an integer between about 1–100.

In a further embodiment, this invention provides a water-soluble composition consisting of a polygalactomannan gum which is crosslinked by reaction with about 1–10 millimoles of a diglycidyl ether of polyoxyalkylene diol corresponding to the formula:

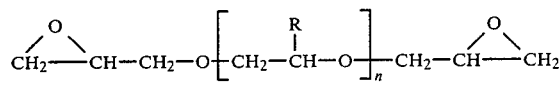

where R is hydrogen or an alkyl substituent containing between about 1–4 carbon atoms, and n is an integer between about 1–100.

The diglycidyl ether-crosslinked polygalactomannan gum preferably is provided at a relatively low level in the aqueous solution, e.g., a quantity between about 0.01–0.5 weight percent, based on the weight of the aqueous medium, to impart useful thixotropic characteristics to the aqueous medium. As the quantity of diglycidyl ether-crosslinked polygalactomannan gum contained in an aqueous solution increases, the viscosity of the aqueous solution increases toward soft gel and then hard gel consistency.

Whenever the following description refers specifically to guar gum, it is understood that the disclosure is applicable to corresponding closely related polygalactomannan gums in general, and locust bean gum in particular.

The term "polygalactomannan gum" as employed herein is meant to include derivatives of polygalactomannan gum in general, and ether derivatives of polygalactomannan gum in particular. Illustrative of ether derivatives are hydroxyalkyl derivatives and carboxyalkyl derivatives of polygalactomannan gum having a degree of substitution (D.S.) or molar substitution (M.S.) between about 0.1–1.5.

By the term "degree of substitution" as employed herein is meant the average substitution of groups (e.g., ether groups) per anhydro sugar unit in the polygalactomannan gums. In guar gum, the polymer consists of a chain of mannose units with a beta-1,4-glycosidic linkage, and a galactose unit is attached to a hydroxyl group of a mannose unit by an alpha-1,6 linkage, in a ratio of about one galactose unit per two mannose units. On the average, each of the anhydro sugar units contains three available hydroxyl sites. A degree of substitution of three would mean that all of the available hydroxy sites have been substituted with ether groups.

Preferred types of polygalactomannan gums for application as a component of the invention thickening compositions include guar gum and locust bean gum. Other preferred types of polygalactomannan gums are the hydroxyalkyl ether and carboxyalkyl ether derivatives which have a degree of substitution between about 0.1 and 1.5, and which have an alkyl group containing between 1 and about 6 carbon atoms, e.g., hydroxyethyl ether and carboxymethyl ether derivatives of guar gum.

Etherification of polygalactomannan gums can be accomplished with polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. Nos. 2,891,050; 3,455,899; and references cited therein.

Hydroxyalkyl ethers of polygalactomannan gums are readily prepared by the reaction of a polygalactomannan gum with an alkylene oxide containing between 1 and about 6 carbon atoms, e.g., ethylene oxide, propylene oxide, butylene oxide, hexylene oxide and the like.

The reaction of a polygalactomannan gum and an alkylene oxide is conveniently conducted at a temperature between about 20° C. and 100° C. and a pressure between about 15 and 150 psi, in a solvent medium in the presence of an alkaline catalyst such as sodium hydroxide or calcium hydroxide. Suitable solvent media include water, cyclic and acyclic alkyl ethers, alkanones, hydrocarbons, dialkylformamide, and the like, and mixtures thereof. Illustrative of useful organic solvents are pentane, acetone, methylethylketone, diethylketone, tetrahydrofuran, dioxane and dimethylformamide.

Employing similar conditions as recited above, carboxyalkyl ether derivatives are prepared by the reaction of a polygalactomannan gum with a monochloroalkanoic acid in a strongly alkaline medium, e.g., the reaction of chloroacetic acid with guar gum yields carboxymethyl ether of guar gum.

An essential aspect of a present invention thickening medium is the presence of a water-soluble basic reagent. The term "basic" as employed herein in reference to a chemical reagent means a compound which contributes alkalinity to an aqueous medium, i.e., its presence provides hydroxyl ions in an aqueous solution.

The quantity of water-soluble basic reagent incorporated in a present invention aqueous solution can be varied over a broad range (e.g., between about 0.001–10 weight percent of the composition), depending on related factors. An important consideration is the establishment of an alkaline pH in the aqueous medium being treated with an invention thickening agent. An aqueous medium pH in the range between about 7-10 is advantageous during the time period that polygalactomannan gum and diglycidyl ether of polyoxyalkylene diol are being dispersed and dissolved in the aqueous medium. If the pH of the aqueous medium is not alkaline, then little or no crosslinking interaction between polygalactomannan gum and diglycidyl ether occurs.

Suitable basic reagents include inorganic compounds which are sufficiently water-soluble to impart alkalinity to an aqueous solution. Illustrative of basic reagents are alkali metal and alkaline earth metal inorganic salts and hydroxides such as carbonates, phosphates and hydroxides of sodium, potassium, lithium and magnesium metals.

A thixotropic aqueous solution can be prepared by the simple expediency of adding the essential constituents to an aqueous medium. The dispersion and dissolution of the added constituents can be facilitated by warming and stirring of the aqueous medium.

A thickened aqueous solution prepared in accordance with a present invention process embodiment has unique viscoelastic properties which appear to be attributable to a low degree of crosslinking effected between polygalactomannan gum molecules by reaction with diglycidyl ether of polyoxyalkylene diol under alkaline conditions:

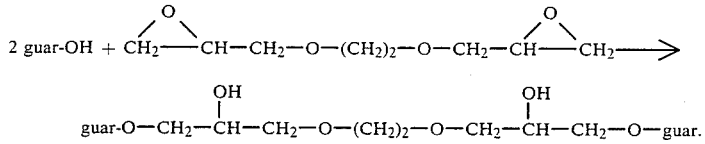

As noted previously, the reaction between polygalactomannan gum and diglycidyl ether is pH sensitive. The pH must be at least about 6.0, and the pH is preferably in the alkaline range between about 7-12, and most preferably is at least about 10.

The polygalactomannan gum and diglycidyl ether being reacted to form the desired diglycidyl ether-crosslinked polygalactomannan gum are employed in quantities between about 0.1-2 weight percent of polygalactomannan gum, based on the weight of aqueous medium, and between about 1-10 millimoles of diglycidyl ether of polyoxyalkylene diol per mole of polygalactomannan gum.

Under aqueous alkaline conditions, the reaction between polygalactomannan gum and diglycidyl ether proceeds at room temperature to form the diglycidyl ether-modified polygalactomannan gum, i.e., polygalactomannan gum with a low degree of diglycidyl ether-crosslinking between polygalactomannan gum molecules. It is believed that there is also present an annular type of macromolecule which is formed by a difunctional addition between one polygalactomannan gum molecule and one diglycidyl ether molecule. An aqueous solution containing 1.0 weight percent polygalactomannan gum, and 2-5 millimoles of diglycidyl ether per mole of polygalactomannan gum, will have a viscosity of about 10,000-100,000 centipoises higher than an aqueous solution which contains 1.0 weight percent of the corresponding polygalactomannan gum not crosslinked with a diglycidyl ether of polyoxyalkylene diol.

An aqueous medium (e.g., a hydraulic fluid) which is thickened with a diglycidyl ether-modified polygalactomannan gum provided by an invention thickening agent exhibits unique viscoelastic properties not previously evident in known aqueous media thickened with a polygalactomannan gum either alone on in combination with other organic or inorganic gelling ingredients.

A high viscosity aqueous solution provided by the present invention is thixotropic, heat stable at temperatures up to about 80° C., and exhibits a high degree of tolerance for the presence of inorganic electrolytes such as sodium chloride.

There is a significant distinction between the thixotropic nature of a present invention viscoelastic aqueous solution and that of a conventional viscoelastic aqueous medium. An invention thixotropic solution does not regain its original high viscosity upon diminution of high shear deformation as does a control solution thickened with guar gum. Instead, the viscosity of the invention solution remains at a low level after a half hour even at a shear rate as low as 0.3 reciprocal seconds.

An invention thickened solution upon relaxation after high shear stirring slowly and continuously regains its original high viscosity as a function of time. This exceptional property of an invention viscoelastic aqueous solution is highly advantageous for purposes of transport through an extensive conduit system.

The following Examples are further illustrative of the present invention. The catalysts and other specific ingredients and processing parameters are presented as being typical, and various modifications can be derived in view of the foregoing disclosure within the scope of the invention.

EXAMPLE I

This Example illustrates the preparation of a thixotropic aqueous solution containing a crosslinked polygalactomannan gum thickening agent in accordance with the present invention.

Polyethylene glycol diglycidyl ether (PEG 200, average molecular weight 200 for polyethylene glycol segment; 50 weight percent based on guar gum weight) is added with rapid stirring to a 1.0 weight percent aqueous solution of guar gum. The resultant solution is treated with 5N aqueous sodium hydroxide to a pH of 12, and the treated solution is incubated at 40° C. for 48 hours. The reaction is quenched by addition of ethanolamine (100 weight percent based on guar gum weight), and the pH is lowered to 10 by adjustment with glacial acetic acid.

The aqueous solution containing guar gum crosslinked with polyethylene glycol diglycidyl ether exhibits a high degree of shear sensitive behavior, as illustrated in FIG. 1.

Figure 2:
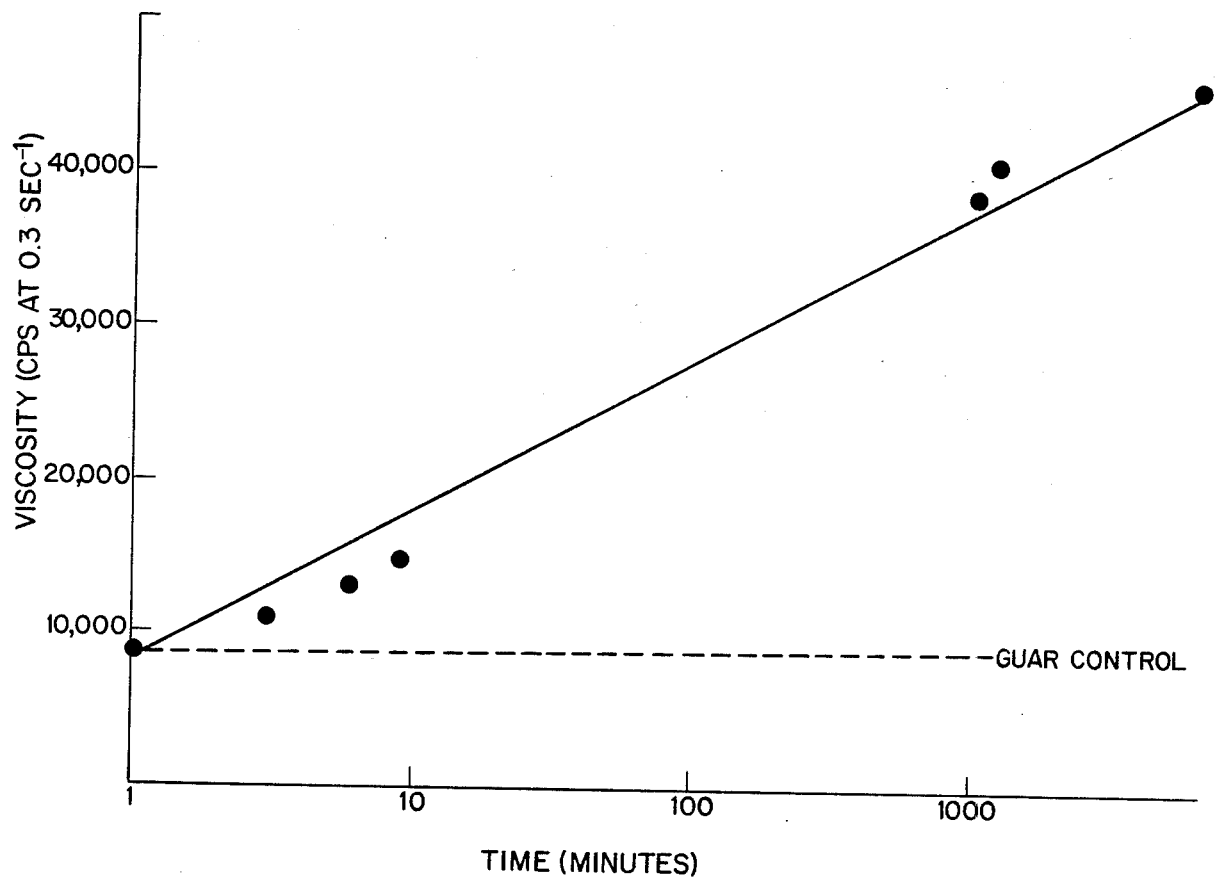
FIG. 2 illustrates the delay in high viscosity restoration of a 1% solution of crosslinked guar gum.

After vigorous shearing, the immediate low shear viscosity of a 1.0 weight percent solution of polyethylene glycol diglycidyl ether-modified guar gum is similar to that of a 1.0 weight percent guar solution, except that a viscosity enhancement in the polyethylene glycol diglycidyl ether-modified guar gum solution commences from the time the solution is allowed to relax, as shown in FIG. 2. The enhanced viscosity tends to recover linearly with the logarithm of time.

Similar results are obtained when locust bean gum is utilized instead of guar gum.

EXAMPLE II

This Example illustrates the preparation of a present invention thixotropic aqueous solution, in which a diglycidyl ether of polyoxyalkylene diol thickening agent is formed in situ. Polyethylene glycol is dried by azeotropic distillation with toluene. A solution of 150 g (0.044 mole) PEG 3400[1], 50 ml of toluene, and 68 µl of boron trifluoride etherate (0.05% based on the total weight of the reagents) is heated to 70° C. in an argon-purged reaction vessel. Epichlorohydin (6.6 ml, 0.084 mole) is added dropwise to the reaction mixture. The exothermic reaction medium is stirred at 70° C. for 2 hours and then cooled to room temperature. To the reaction mixture is added 100 ml of toluene and 1.0 g of anhydrous $Na_2CO_3$. The mixture is stirred for 1 hour at 50° C., then filtered while warm. The polyethylene glycol bischlorohydrin ether product is precipitated by addition of ethyl ether, filtered, and vacuum dried.

(1) Polyethylene glycol (average molecular weight of 3400).

An aqueous solution of polyethylene glycol bischlorohydrin ether (300 weight percent based on guar gum weight, dissolved in a minimum volume of water) is added to a 1.0 weight percent aqueous solution of guar gum. The resultant solution is treated with 5N sodium hydroxide to a pH of 12, and the treated solution is incubated at 40° C. for 48 hours to form diglycidyl ether of polyethylene glycol in situ, and to form crosslinked guar gum.

The aqueous solution of guar gum crosslinked with the in situ formed polyethylene glycol ether derivative exhibits shear sensitive behavior similar to that described in Example I.

EXAMPLE III

This Example illustrates the relationship between an aqueous solution viscosity and the concentration of a present invention thickening agent.

Aqueous solutions are thickened with varying concentrations of polyethylene glycol diglycidyl ether and the solution viscosities are measured.

Table I demonstrates that the viscosity enhancement of guar solutions upon treatment with polyethylene glycol diglycidyl ether thickening agent depends on the molar concentration of the diglycidyl ether, and not upon the molecular weight or weight percent of the polyethylene glycol segment of the diglycidyl ether thickening agent.

TABLE I

| Average Molecular Weight of Polyethylene Glycol Segment | Diglycidyl Ether Concentration (mM)[a] | Guar Solution Viscosity (CPS at 0.3 sec$^{-1}$)[b] |
| --- | --- | --- |
| 400 | 9 | 43,000 |
| 3400 | 9 | 42,000 |
| 200 | 18 | 80,000 |
| 400 | 18 | 80,000 |

[a]Concentration of polyethylene glycol diglycidyl ether in the reaction mixture with guar gum.
[b]Viscosity of the 1% guar solution after the 48 hour reaction.

EXAMPLE IV

This Example illustrates the heat stability of a present invention thixotropic aqueous solution.

Solutions of hydroxypropyl guar are treated with polyethylene glycol diglycidyl ether, and the heat stabilities are determined in comparison with a hydroxypropyl guar control.

The results are summarized in Table II. The present invention thixotropic aqueous solutions exhibit complete stability under the test conditions.

TABLE II

| | 1% Solution Viscosity (CPS at 0.3 sec$^{-1}$) | |
| --- | --- | --- |
| | Initial | After Heating[a] |
| Hydroxypropyl Guar Control | 45,000 | 50,000 |
| Modified Hydroxypropyl Guar[b] | 83,000 | 83,000 |
| Modified Hydroxypropyl Guar[c] | 118,000 | 120,000 |

[a]Samples are swirled at 200 rpm in an Environmental Incubator Shaker at 60° C. for 18 hours.
[b]Modified with 40 weight percent polyethylene glycol (average molecular weight 200) diglycidyl ether (based on the weight of gum).
[c]Modified with 60 weight percent polyethylene glycol (average molecular weight 200) diglycidyl ether.

What is claimed is:

1. A process for preparing a thixotropic aqueous solution which comprises treating an aqueous medium with a thickening agent comprising (1) polygalactomannan gum, (2) between about 1–10 millimoles of diglycidyl ether of polyoxyalkylene diol per mole of polygalactomannan gum, and (3) a water-soluble basic reagent.

2. A process in accordance with claim 1 wherein the polygalactomannan gum is guar gum or an ether derivative of guar gum.

3. A process in accordance with claim 1 wherein the polygalactomannan gum is locust bean gum or an ether derivative of locust bean gum.

4. A process in accordance with claim 1 wherein the basic reagent is an inorganic salt.

5. A process in accordance with claim 1 wherein the basic reagent is an alkali metal salt.

6. A process in accordance with claim 1 wherein the basic reagent is alkali metal hydroxide.

7. A process in accordance with claim 1 wherein the basic reagent is alkali metal carbonate.

8. A process in accordance with claim 1 wherein diglycidyl ether crosslinking of polygalactomannan gum occurs in the aqueous solution at a pH above about 7.

9. A process for producing a thixotropic aqueous solution containing crosslinked polygalactomannan gum which comprises dissolving in an aqueous medium constituents comprising (1) polygalactomannan gum, (2) between about 1–10 millimoles of diglycidyl ether of polyoxyalkylene diol per mole of polygalactomannan gum, and (3) a water-soluble basic reagent; wherein the product thixotropic solution at a 1.0 weight percent content level of the polygalactomannan gum exhibits a viscosity of 10,000–120,000 centipoises at a shear rate of 0.3 reciprocal seconds, a viscosity of 300–10,000 centipoises at a shear rate of 5 reciprocal seconds, and a viscosity of 50–300 centipoises at a shear rate of 500 reciprocal seconds, and wherein the solution has the ability to recover the low-shear high-viscosity state over an elapsed time period.

10. A thixotropic aqueous solution produced in accordance with the process of claim 9.

11. A thixotropic aqueous solution containing a thickening agent comprising polygalactomannan gum which is crosslinked with a diglycidyl ether of polyoxyalkylene diol.

12. A thixotropic aqueous solution in accordance with claim 11 wherein the polygalactomannan gum is guar gum.

13. A thixotropic aqueous solution in accordance with claim 11 wherein the polygalactomannan gum is locust bean gum.

14. A thixotropic aqueous solution in accordance with claim 11 wherein the diglycidyl ether of polyoxyalkylene diol corresponds to the formula:

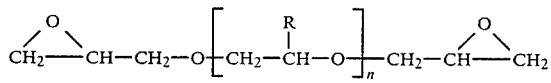

where R is hydrogen or an alkyl substitutent containing between about 1-4 carbon atoms, and n is an integer between about 1-100.

15. A water-soluble composition consisting of a polygalactomannan gum which is crosslinked by reaction with about 1-10 millimoles of a diglycidyl ether of polyoxyalkylene diol corresponding to the formula:

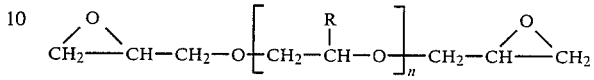

where R is hydrogen or an alkyl substituent containing between about 1-4 carbon atoms, and n is an integer between about 1-100.

* * * * *